Sept. 18, 1956 J. GREAVES 2,763,362
FLEXIBLE GRAIN AUGER
Filed April 20, 1953 2 Sheets-Sheet 1

INVENTOR-
Joseph Greaves.
BY
ATTORNEY

Sept. 18, 1956  J. GREAVES  2,763,362
FLEXIBLE GRAIN AUGER
Filed April 20, 1953  2 Sheets-Sheet 2
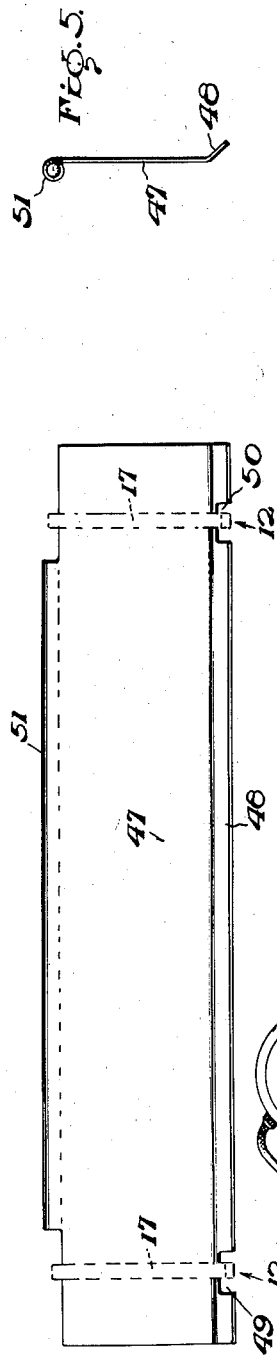
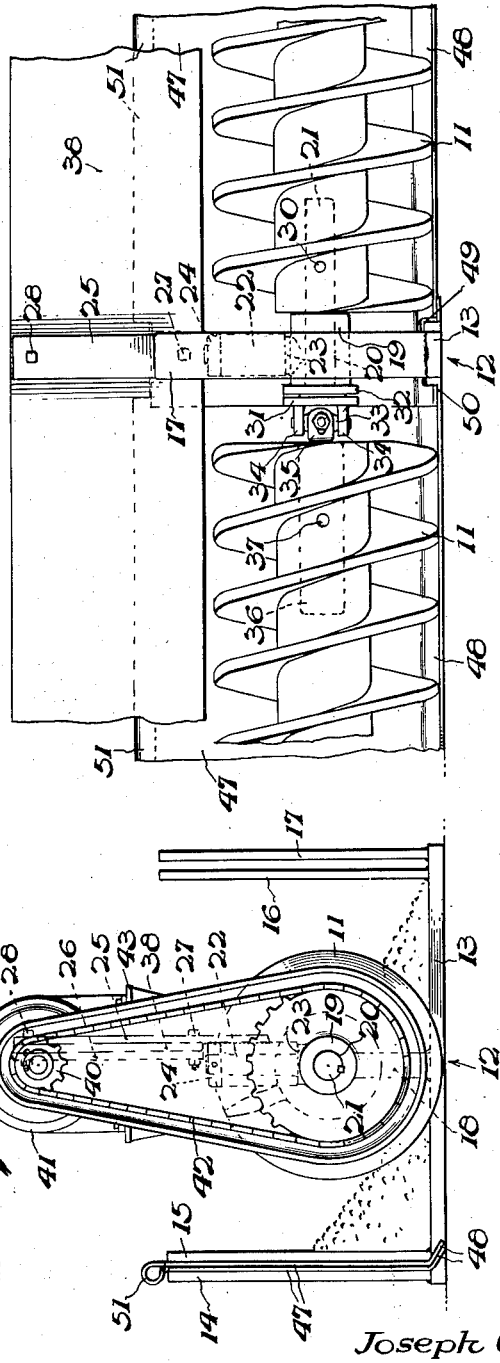
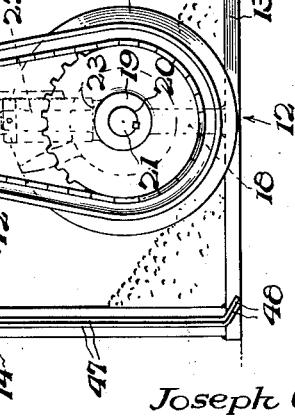
INVENTOR
Joseph Greaves.
BY
ATTORNEY

United States Patent Office 2,763,362
Patented Sept. 18, 1956

2,763,362

FLEXIBLE GRAIN AUGER

Joseph Greaves, Toston, Mont.

Application April 20, 1953, Serial No. 349,907

5 Claims. (Cl. 198—213)

This invention relates to augers for removing grain from storage bins and one of the objects is the provision of such an auger which can be bent in the approximate shape of the arc of a circle to fit against the inner wall of a circular storage bin.

Another object of the invention is the provision of a motor driven flexible auger in combination with means for flexing the auger and controlling the degree of flexure as the auger is moved about the storage bin.

A further object is the provision of such an auger which is constructed of a series of linear units and which can be lengthened or shortened by adding or subtracting such units to any given assembly.

A still further object of the invention is the provision of a grain auger which is highly efficient in operation, particularly in the case of its use in a circular storage bin having a side delivery outlet.

A still further object of the invention is the provision of such an auger comprising a plurality of straight sections connected together with universal joints mounted on brackets, the brackets being connected together with a flexible resilient member, and means for bending the member.

These and other objects and advantages of the invention will appear more fully from the following description considered together with the accompanying drawing.

In the drawing:

Figure 2 is an end elevational view of the auger.

Figure 3 is a fragmentary side elevational view showing details of one of the universal joints and brackets of the embodiment.

Figure 4 is an elevational view of one of the shields.

Figure 5 is an end view of the shield shown in Figure 4.

Figure 1:
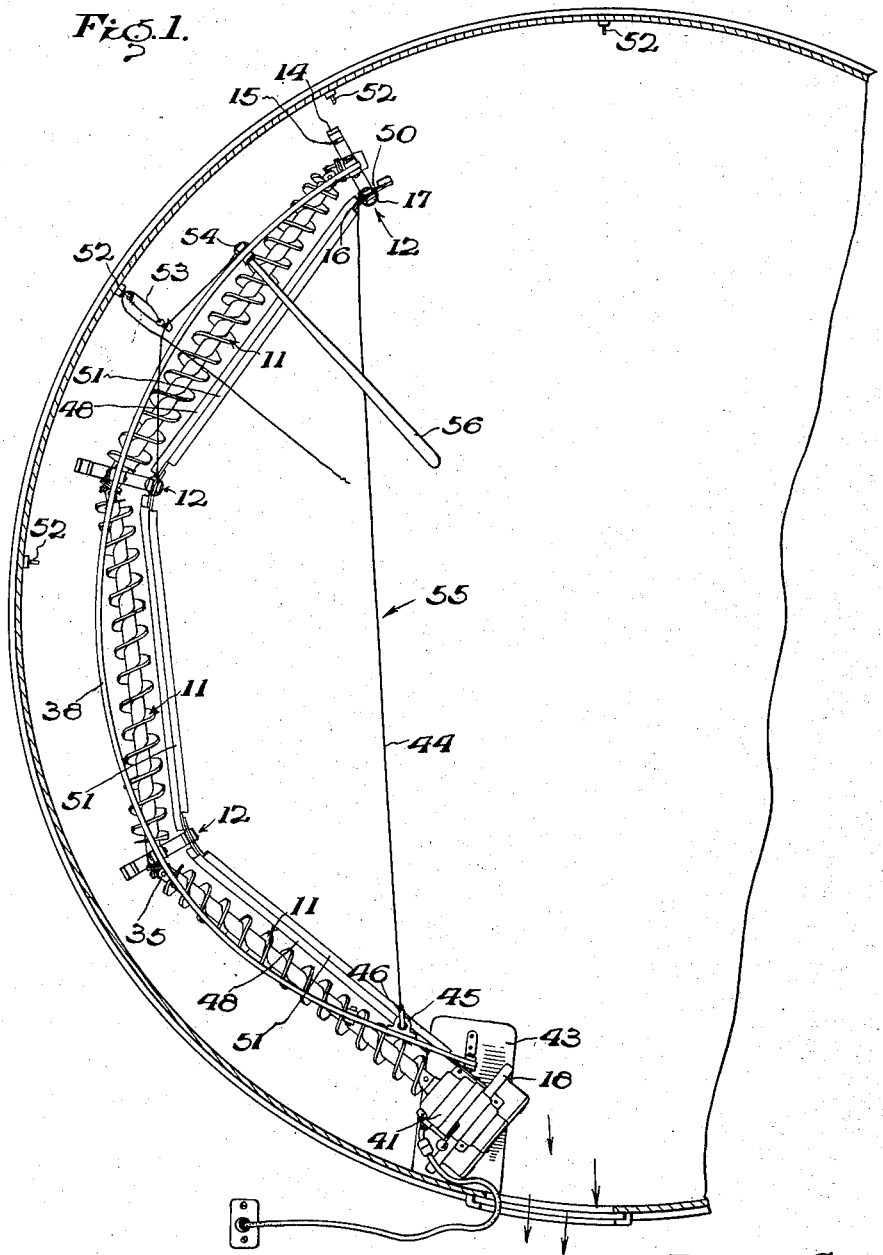
Figure 1 is a top plan view of an embodiment of the invention resting on the floor of a circular grain bin, the latter being shown partly broken away.

Referring with more particularity to the drawing in which like numerals designate like parts throughout the several views, the embodiment illustrated comprises a series of tandem arranged straight auger sections 11 (3 shown in the drawing) which are connected together by universal joints carried on brackets, the latter being generally designated by the numeral 12.

Each bracket 12 comprises a transverse base member 13 which normally rests on the floor and slides thereover. At either end of the base member there are provided a pair of laterally spaced vertical bars 14, 15 and 16, 17, the functions of which will be explained hereinafter.

At the center of the base member 13, a vertical post 18 is rigidly secured. The post 18 has an enlarged portion 19 which has a central bore 20 forming a bearing for a horizontal shaft 21. A hollow rotatable sleeve 22 is rotatably mounted on the shaft, rests on a boss 23 above the enlarged portion 19 and is held in position by a retaining collar 24 secured to the top of the post and engaging the top of the sleeve, substantially as shown.

A vertical arm 25 is secured at its bottom to the sleeve 22 and projects upwardly therefrom. A clamping bar 26 is carried by the arm 25 on bolts 27 and 28.

The shaft 21 extends through the bearing 20 from one side to the other for engagement with one end of an auger section to which it is secured by a shear pin 30. The shaft carries on the other side of the bearing, a collar 31 which slidably abuts a flange 32 of the portion 19. By these means the shaft is maintained against lateral displacement relative to the bracket.

A universal joint 33 is mounted with one axis pivoted to two parallel arms 34, 34 projecting from the collar 31 and its other cross axis between similar arms 35 of a shaft 36. The shaft 36 is set in the end of the adjacent auger section and held in place with a shear pin 37.

By this arrangement rotation is transmitted from one auger section to the other irrespective of their relative angular positions.

The brackets 12 are all connected to a resiliently flexible backboard or beam 38 of wood or other suitable material. The backboard is secured in position to the vertical arms 25 of the brackets by the clamping bars 26 and bolts 27 and 28.

One end of the assembly is connected to a sprocket wheel 39 which is geared to the sprocket wheel 40 of the take-off shaft of a motor, such as the electric motor 41, by means of the sprocket chain 42.

The motor 41 is mounted on a suitable support 43 which rests on the floor.

The backboard 38 is straight in its normal, unstressed position, but can be bowed on either side by means of a cable 44 against the force of its inherent resiliency. One end of the cable is connected to the backboard at the end opposite the motor or to one side of the end bracket, as shown in Figure 1. The other end of the cable 44 is connected to a winch 45 mounted at or near the other end of the backboard. The bending of the backboard is thus effected by turning the winch crank 46 to wind up a portion of the cable wrapped around it.

Each auger section 11 is provided with a shield or skirt member 47 of sheet metal or other suitable material, the ends of which are removably disposed between the vertical arms 14, 15 or 16, 17, depending on the direction in which the device is to be moved. The bottom edge 48 of the shields are bent at an angle and rest on the floor acting thus as a lip to guide the grain into the space between the auger sections and the shields. Notches 49 and 50 are cut out at the bottom of each shield to register with the base members 13 and permit the bottom edge 48 of the shield to contact the floor. These slots are somewhat wider than the base members to accommodate the increase in distance between the vertical arms of consecutive brackets 12 as the backboard is bent into an arc from its normally straight position. The top edges of the shield members are rolled or beaded as at 51 between the vertical arms of the brackets to stiffen them and help maintain them parallel to the axis of their respective auger sections. When the backboard is bent, the ends of the shield members, beyond the beaded top edge, also bend.

In actual operation, the device is used to remove residual grain from the floor of a bin which cannot flow by gravity to the outlet of the bin. The bulk of such residual grain will slope upwardly from the outlet opening of the bin to a degree corresponding to its angle of repose. To remove this grain, the device of this invention, with the backboard in its normally straight position, is placed on the slope side of the grain diametrically across the bin, with the motor end over the bin outlet. The motor is then started and grain coming in contact with the auger is thus moved toward the motor end and falls into the outlet opening. As this action continues, the auger works its way down to a horizontal position on the floor of the bin. When no more grain can be removed from the bin with the auger in this horizontal position, it is gradually moved to one side of the bin and the backboard is progressively bowed by means of the cable and winch arrangement, as explained above, until it reaches the position shown in Figure 1. The auger is then returned to the center of the bin and the strain on backboard is relaxed by unwinding cable 44 thereby permitting the auger, under the action of the resilient force set up in the backboard, to return to its straight position. The shields are then placed on the other side of the auger sections and the procedure repeated for the other side of the bin.

To facilitate moving the auger about in the bin, hooks 52 may be spaced around the inner walls of the bin above the level of the residual grain for removably holding a pulley or pulley block 53, suitable hooks 54 being set at convenient places on the device for connection with the pulley rope 55. A push bar 56 may also be used to assist in such maneuvering.

I claim:

1. A flexible grain auger comprising a plurality of tandem arranged auger sections, brackets at the ends of said auger sections, means rotatably supporting said auger sections on said brackets and connecting said sections together for relative universal movement, a member mounted on each bracket for rotation about a vertical axis, a resiliently flexible beam extending longitudinally over the top of said auger sections, means securing each of said members to said beam, means for rotating said sections, means for flexing said beam, a longitudinal shield extending along one side of each of said auger sections, and means carried by said brackets for removably supporting said shields.

2. A device as defined by claim 1 in which the means for flexing the beam, comprises a winch connected to one end of the beam and a cable having one end connected to the winch, the other end of the cable being connected to the other end of the beams.

3. A flexible grain auger as defined by claim 1 in which the brackets each comprise a horizontal base member, a vertical post secured to the center of the said member, a vertical sleeve rotatably mounted on said post, a shaft bearing carried by said post below said sleeve, a vertical arm secured to the sleeve and extending upwardly therefrom, and a clamp member carried by said arm.

4. A flexible grain auger as defined by claim 3 in which the brackets each have a pair of laterally spaced vertical arms secured to the ends of the base member.

5. A flexible auger as defined by claim 3 in which the brackets each have a retaining collar secured to the post above the sleeve.

References Cited in the file of this patent

UNITED STATES PATENTS

| | | |
|---|---|---|
| 1,515,459 | Coble | Nov. 11, 1924 |
| 1,564,187 | Ahrens | Dec. 8, 1925 |
| 1,570,085 | Sape | Jan. 19, 1926 |
| 1,826,853 | Williams et al. | Oct. 13, 1931 |
| 2,037,959 | Bean | Apr. 21, 1936 |
| 2,500,043 | Radtke | Mar. 7, 1950 |